(12) United States Patent
Pecak

(10) Patent No.: US 11,725,734 B2
(45) Date of Patent: Aug. 15, 2023

(54) SEAL ASSEMBLY WITH A CASE FOR INDUCING PUMPING

(71) Applicant: AKTIEBOLAGET SKF, Gothenburg (SE)

(72) Inventor: Robert D. Pecak, Naperville, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 83 days.

(21) Appl. No.: 17/644,880

(22) Filed: Dec. 17, 2021

(65) Prior Publication Data
US 2023/0193997 A1 Jun. 22, 2023

(51) Int. Cl.
*F16J 15/3204* (2016.01)

(52) U.S. Cl.
CPC ................... *F16J 15/3204* (2013.01)

(58) Field of Classification Search
CPC .... F16J 15/00; F16J 15/16; F16J 15/50; F16J 15/52; F16J 15/32; F16J 15/3208; F16J 15/3204; F16J 15/3212; F16J 15/3216; F16J 15/322; F16J 15/3224; F16J 15/3228; F16J 15/3248; F16J 15/3252; F16J 15/3256
USPC ....................................................... 277/572
See application file for complete search history.

(56) References Cited

U.S. PATENT DOCUMENTS

| | | | |
|---|---|---|---|
| 3,586,342 A * | 6/1971 | Staab | F16J 15/3244 277/560 |
| 3,640,542 A | 2/1972 | Mowat et al. | |
| 3,790,180 A | 2/1974 | Heyn et al. | |
| 3,895,814 A | 7/1975 | Kupfert et al. | |
| 3,929,340 A | 12/1975 | Peisker | |
| 4,094,519 A | 6/1978 | Heyn et al. | |
| 4,399,998 A | 8/1983 | Otto | |
| 4,739,998 A | 4/1988 | Steusloff et al. | |
| 5,350,181 A | 9/1994 | Horve | |
| 6,722,659 B2 * | 4/2004 | Mohr | F16J 15/3212 277/560 |
| 6,729,624 B1 * | 5/2004 | Johnston | F16J 15/3244 277/560 |
| 9,027,928 B2 * | 5/2015 | Epshetsky | F16J 15/3212 277/309 |
| 9,228,658 B2 * | 1/2016 | Epshetsky | F16J 15/3244 |
| 2004/0227304 A1 * | 11/2004 | Kern | F16J 15/3228 277/559 |

* cited by examiner

*Primary Examiner* — Nathan Cumar
(74) *Attorney, Agent, or Firm* — J-Tek Law PLLC; Scott T. Wakeman; Mark A. Ussai

(57) ABSTRACT

A seal assembly includes an annular rigid support member having a centerline and including an axial portion coupleable with the outer member and a radial portion extending inwardly from the axial portion. The radial portion has an outer end formed with the axial portion and an inner end defining a central opening disposeable around the shaft and being formed asymmetrical about the centerline and/or having a varying radial distance from the centerline. An annular sealing member has an outer portion attached to the support member and an inner portion with a first end providing a sealing lip, the sealing lip sealingly engageable with a running surface about a shaft to define a sealing interface, and a second end attached to the inner end of the support member radial portion. As such, contact pressure of the sealing lip against the running surface varies about a circular perimeter of the sealing interface.

20 Claims, 11 Drawing Sheets

SEAL ASSEMBLY WITH A CASE FOR INDUCING PUMPING

BACKGROUND OF THE INVENTION

The present invention relates to seals, and more particularly to radial lip or "oil" seals.

Radial lip seals are known and include an annular, typically elastomeric sealing member disposed between a shaft and an outer member, such as a housing, bearing outer ring, or hub. The sealing member is attached to, and preferably encases, a support member or case and has a circumferential sealing lip engageable inwardly with an outer surface of the shaft or outwardly with an inner surface of the outer member. Often, the sealing lip has some structural feature, such as a wave-like profile, helical grooves, etc. to push or "pump" small quantities of oil or other liquid entering in a sealing interface about the shaft back into the volume being sealed.

SUMMARY OF THE INVENTION

The present invention is a seal assembly for sealing between an inner shaft and an outer member, the outer member having an inner circumferential surface defining a bore and the shaft being disposed within the bore and having an outer circumferential surface, the shaft or the outer member being rotatable about a central axis extending through the shaft. The seal assembly comprises an annular rigid support member having a centerline and including an axial portion coupleable with the outer member and a radial portion extending inwardly from the axial portion. The radial portion has an outer radial end integrally formed with the axial portion and an inner radial end defining a central opening disposeable around the shaft and being formed asymmetrical about the centerline and/or having a varying radial distance from the centerline. An annular sealing member has an outer portion attached to the support member and an inner portion with a first end providing a sealing lip, the sealing lip being sealingly engageable with a running surface about the shaft so as to define a circumferential sealing interface, and a second end attached to the inner end of the support member radial portion. As such, a contact pressure of the sealing lip against the running surface varies about a circular perimeter of the sealing interface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
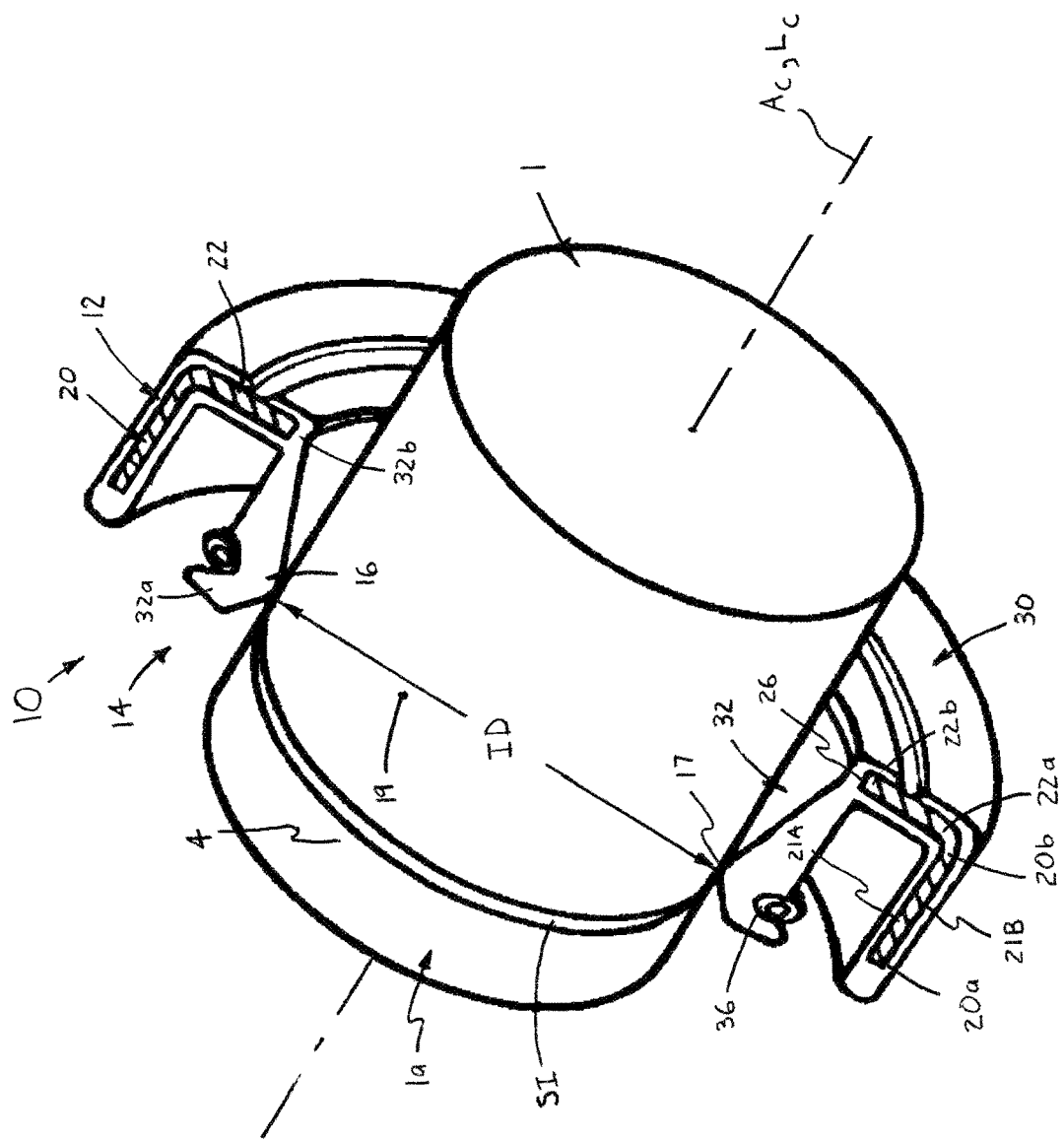
FIG. 1 is a broken-away, perspective view of a seal assembly of the present invention, shown engaged with a shaft.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-11 a seal assembly 10 for sealing between an inner shaft 1 and an outer member 2, such as for example, a hub or a housing. The outer member 2 has an inner circumferential surface 2a defining a bore 3 and the shaft 1 is disposed within the bore 3 and has an outer circumferential surface 1a, either the shaft 1 or the outer member 2 being rotatable about a central axis $A_C$ extending through the shaft 1. The seal assembly 10 basically comprises an annular rigid support member or "case" 12 coupleable with the housing 2 and an annular elastomeric sealing member 14 attached to the support member 12 and having a sealing lip 16 sealingly engageable with a running surface 4 about the shaft 1 with a circumferentially varying contact pressure CP. The running surface 4 may be provided by the shaft outer surface 1a or an outer surface of a sleeve, a bearing ring or another component (none shown) disposed upon the shaft outer surface 1a.

More specifically, the annular rigid support member 12 has a centerline $L_C$, which is substantially coaxial with the central axis $A_C$ when disposed about the shaft 1, and includes an axial portion 20 and a radial portion 22. The support member axial portion 20 has opposing, first and second axial ends 20a, 20b and inner and outer circumferential surfaces 21A, 21B. The radial portion 22 extends radially inwardly from the axial portion 20 and has an outer radial end 22a integrally formed with the axial portion 20 and an inner radial end 22b. The inner radial end 22b defines a central opening 24 disposeable around the shaft 1 and is formed asymmetrical around, and/or has a varying radial distance R from, the centerline $L_C$ of the support member 12.

Specifically, the central opening 24 is defined by a closed inner edge 26 formed in the support member radial portion 22 which extends about the support member centerline $L_C$. The inner edge 26 is formed such that a radial distance R between each point $p_n$ on the inner edge 26 and the centerline $L_C$ varies about the perimeter of the inner edge 26. In other words, various points $p_1$, $p_2$, etc., on the inner edge 26 are each located at a different radial distance $r_1$, $r_2$, respectively, from the centerline $L_C$, as indicated in FIGS. 3, 5, 7 and 9. Such an asymmetrical and/or radially varying edge 26 may be a complex-shaped enclosed line 40 (FIGS. 3, 4, 6 and 7), an ellipse 50 (FIGS. 8 and 9), a circle 60 centered about an axis 61 offset from the support member centerline $L_C$ (FIGS. 10 and 11), etc. as described in detail below.

Figure 5:
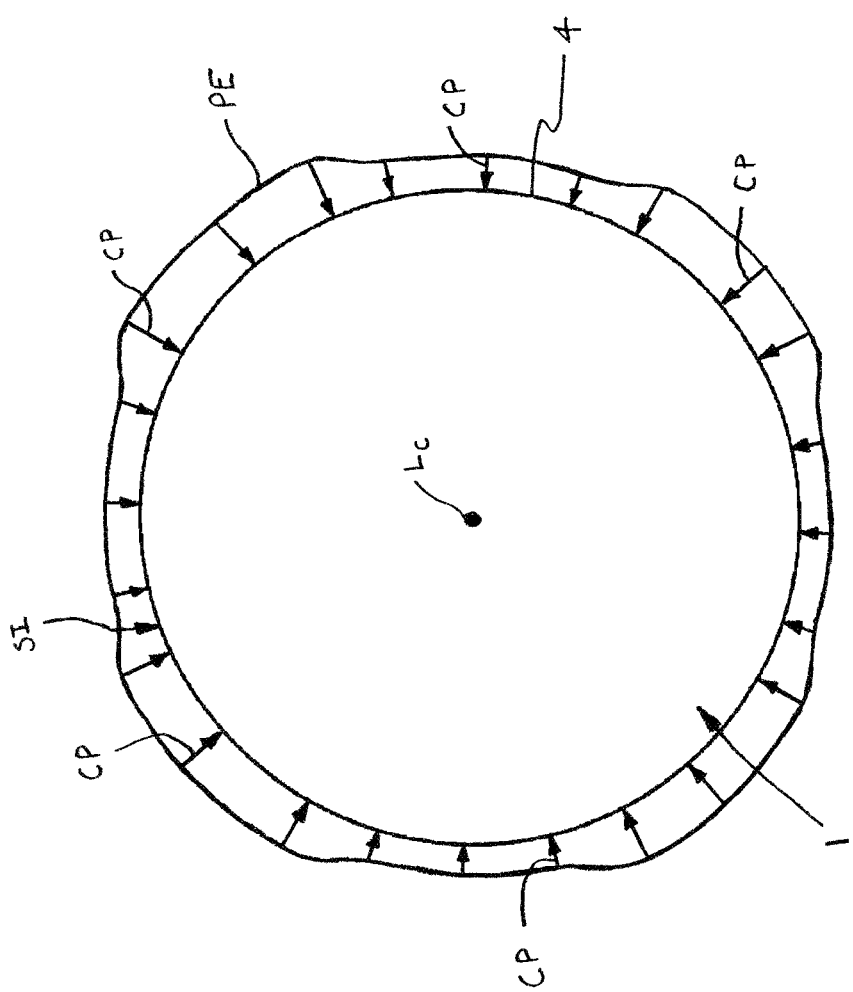
FIG. 5 is a simplified view of a contact pressure profile about a seal contact surface on a shaft.

Further, the annular sealing member 12 has an outer portion 30 attached to the support member 12 and an inner portion 32, which preferably extends both radially and axially from the outer portion 30, particularly when the seal assembly is disposed about the shaft 1. The seal member inner portion 32 has first and second ends 32a, 32b, respectively, the first end 32a providing the sealing lip 16 sealingly engageable with the shaft running surface 4 so as to define a circumferential sealing interface SI (FIGS. 1 and 5). Furthermore, the second end 32b of the sealing member inner portion 32 has a substantially circular inner surface 33 and is attached to the inner end 22b of the support member radial portion 22 such that the inner surface 33 is concentric or centered about the centerline $L_C$ of the support member 12.

Referring to FIGS. 4, 7, 9 and 11, due the varying radial distance R of the support member inner edge 26 about the centerline $L_C$, the edge 26 has radially innermost sections $26^I$ located more proximal to the inner surface 33 of the sealing member inner portion 32. The rigidity of each portion $14^R$ of the sealing member 14 attached to one of the support member innermost sections $26^I$ is greater than other sealing member portions $14^F$ (described below), causing a corresponding increase in the contact pressure CP within each section $SI^R$ of the sealing interface SI engaged by one the "rigid" seal sections $14^R$. Conversely, the inner edge 26 also has radially outermost sections $26^O$ located more distally from the inner surface 33 of the sealing member inner portion 32. The flexibility of each portion $14^F$ of the sealing member 14 attached to one of the support member outermost sections $26^O$ is greater than the "rigid" portions $14^R$, causing a corresponding decrease in the contact pressure CP within each section $SI^F$ of the sealing interface SI engaged by one of the "flexible" seal sections $14^F$.

Due to the inconsistent or varying support of the seal inner portion 32 provided by the support member radial portion 22, the contact pressure CP of the sealing lip 16 against the running surface 4 varies about a circular perimeter of the sealing interface SI, as indicated by the simplified exemplary pressure envelope PE of FIG. 5. With this pressure variation, the seal assembly 10 is configured such that liquids, for example small quantities of oil, which enter the sealing interface SI are "pumped" or directed axially out of the sealing interface SI by the varying contact pressure CP of the sealing lip 16 against the running surface 4 when the shaft 1 or the outer member 2 (and thereby also the seal assembly 10) rotates about the central axis $A_C$.

Therefore, the present seal assembly 10 operates as a pumping seal to return any leaked oil (or other liquid being sealed) without the necessity of forming the lip 16 with a complex structure, for example, with a wave-like inner surface, or adding structural features such as helices or spirals, or otherwise forming the seal lip with a non-standard or non-conventional structure to induce sealing. In fact, the sealing member 14 is formed conventionally, and the support member 12 is also generally conventionally formed other than providing the asymmetric or radially varying central opening 24, which can be easily accomplished for example, by changing the outer surface profile and/or location of a punch (not shown) used to form the opening 24 in a standard stamping operation. Having described the basic structure and functions above, these and other additional features of the present seal assembly 10 are described in further detail below.

Figure 2:
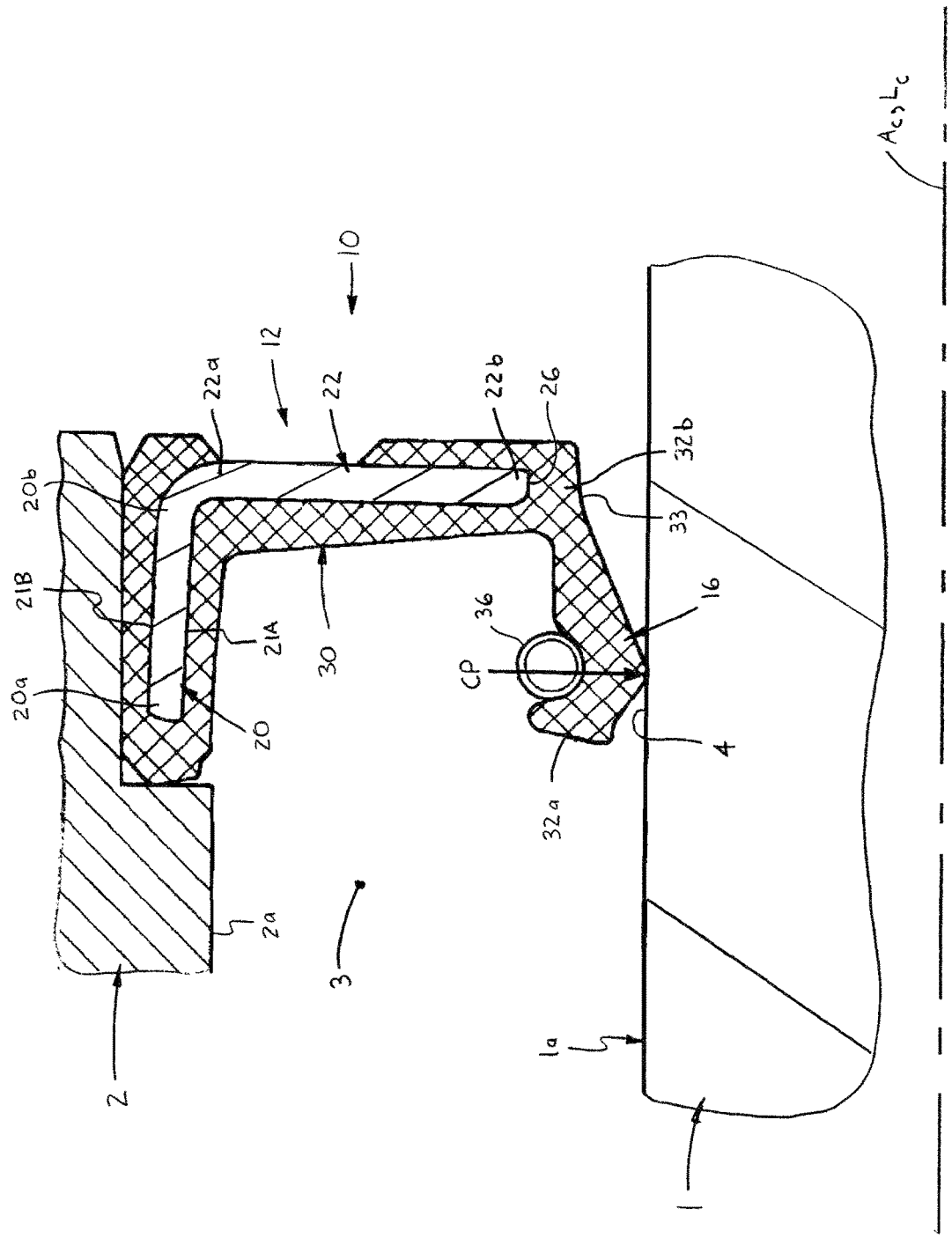
FIG. 2 is a broken-away, axial cross-sectional view of the seal assembly, shown mounted to a shaft and disposed within an outer member.

Referring to FIGS. 1 and 2, as stated above, the present seal assembly 10 is generally formed as a conventional radial lip seal or "oil seal", with the sealing member 14 generally formed in a standard or previously known structure and the support member 12 also generally conventionally formed, with the exception of the shape and/or location of the central opening 24, as discussed in further detail below. Specifically, the support member 12 is formed in a conventional manufacturing process, preferably in a metal stamping operation, with the axial portion 20 generally formed as a circular ring and the radial portion 22 is formed removing or "punching" the center of solid disk (i.e., part of a metal blank). Specifically, this central part of the blank is removed so as to form the central opening 24 and the inner end 22b of the support member radial portion 22 in one of the presently preferred constructions as described below. Alternatively, the support member 12 may be formed in any other appropriate process, such as for example, being molded of a polymeric material, cast or forged of a metallic material, etc.

In any case, the formed support member 12 is then preferably placed in a mold and an appropriate elastomeric material (e.g., natural or synthetic rubber) is added to the mold. The mold is then heated to both form the desired shape of the inner and outer portions 30, 32 of the sealing member 14, and particularly the desired shape of the sealing lip 16, and to attach or thermally bond the outer portion 30 of the sealing member 14 to the stamped metal support member 12. Preferably, the inner portion 32 of the sealing member 14 has a thickness that increases in a direction from the inner portion second end 32b and toward the inner portion first end 32a such that the sealing lip 16 has generally wedge-shaped axial cross-sections, as shown in FIGS. 1 and 2. Alternatively, the inner portion 32 of the sealing member 12 has a thickness that is generally constant (not shown) or has any other appropriate shape (no alternatives shown). Further, particularly with a wedge-shaped sealing lip 16, the seal assembly 10 preferably includes a garter spring 36 disposed about the sealing lip 16 to bias the lip 16 radially inwardly against the running surface 4. However, the seal assembly 10 may be formed without any garter spring 36 and with the seal lip 16 being sealingly engaged solely by means of diametrical interference between the lip 16 and the running surface 4.

Referring to FIGS. 3-11, the present seal assembly 10 may be formed with one of several different alternative structures or constructions of the support member 12, which differ from each other only by the shape and/or location of the central opening 24. Otherwise, the structure and details of the support member 12 and the sealing member 14 are preferably identical and as described in detail above. Also, although three specific constructions of the support member 12 are described below, the support member 12 may be formed with any other shape and/or position of the central opening 24 in the support member 12 that functions generally as described herein.

Figure 3:
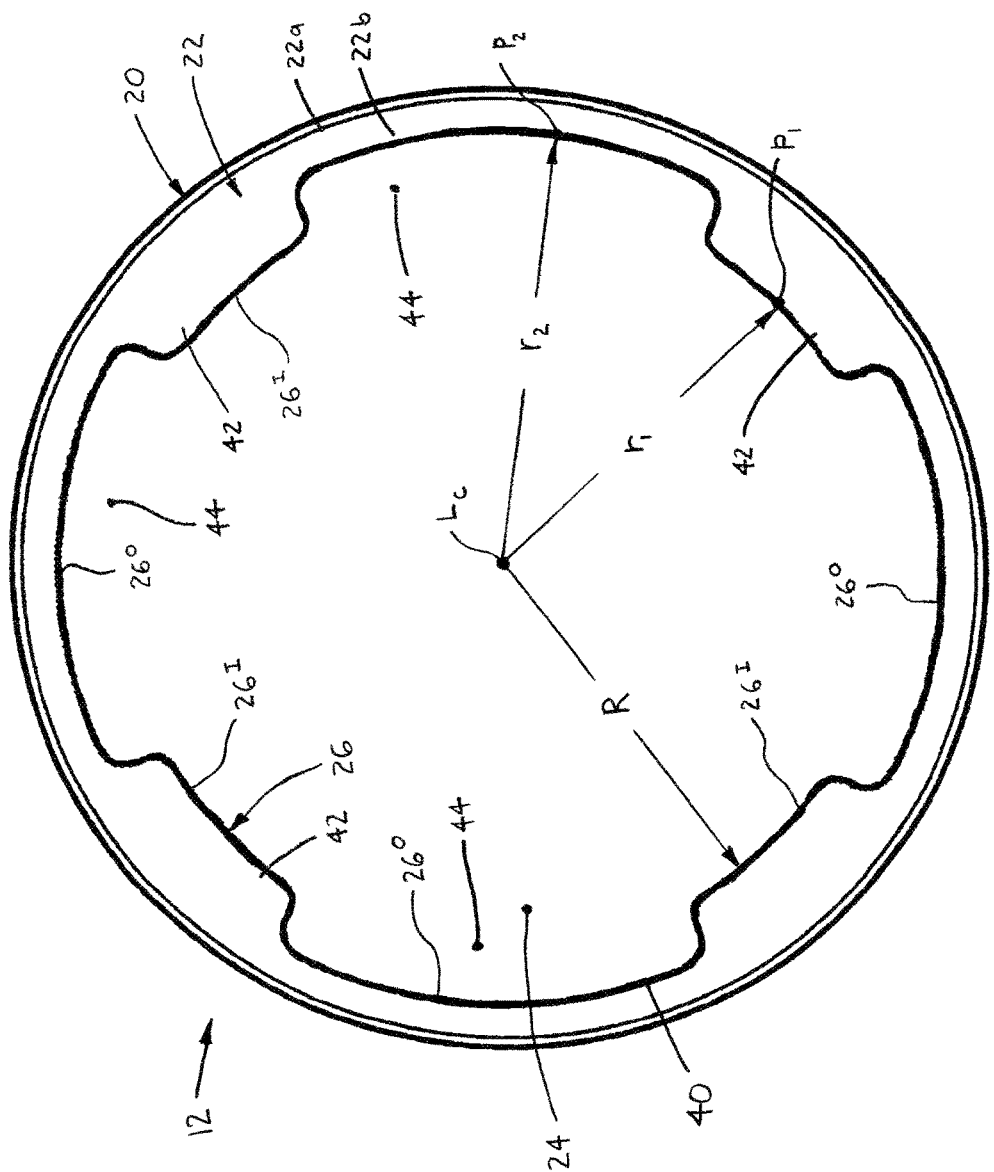
FIG. 3 is a top plan view of a first construction support member of the seal assembly.
Figure 4:
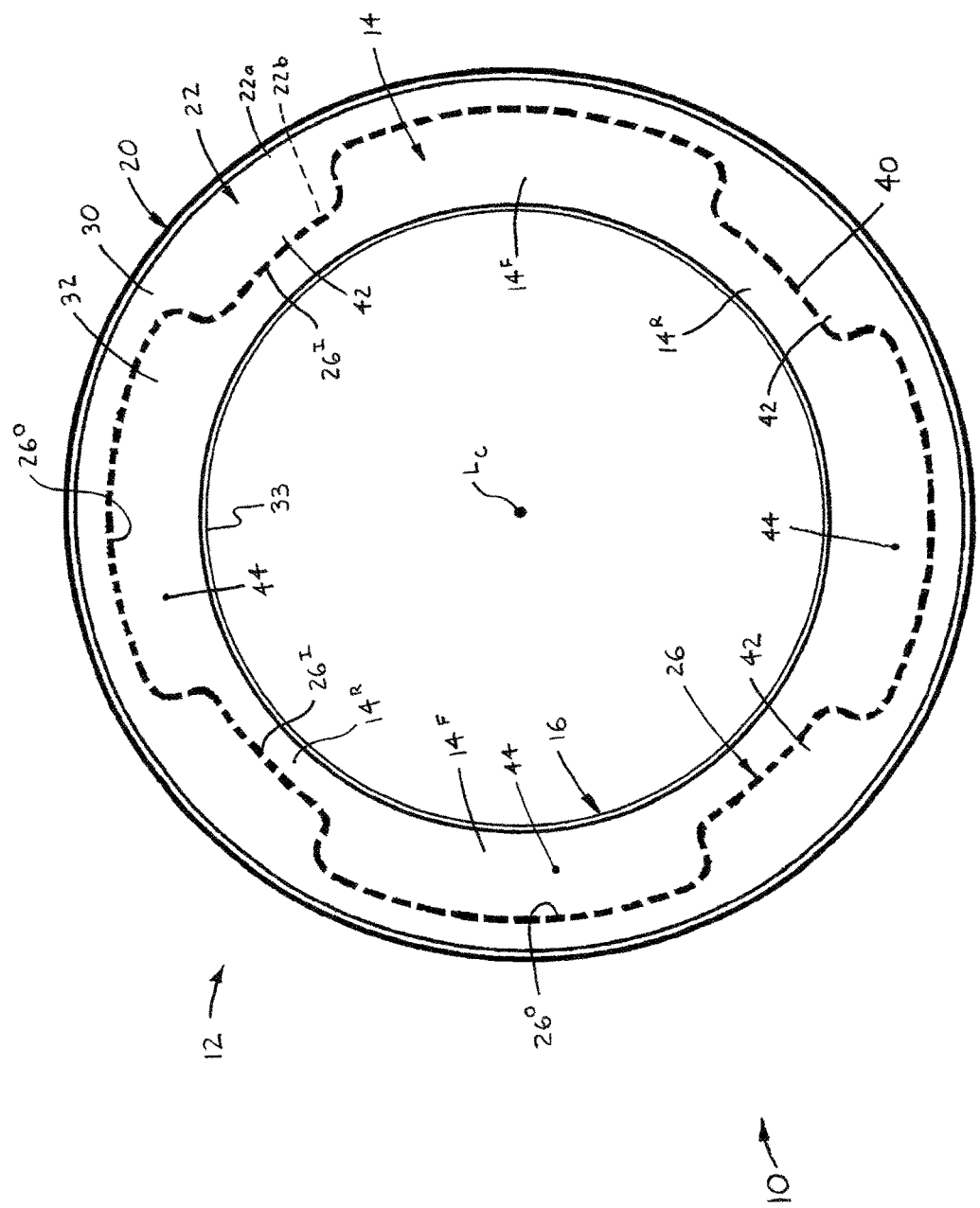
FIG. 4 is a more diagrammatic, top plan view of the seal assembly with the first construction support member.
Figure 6:
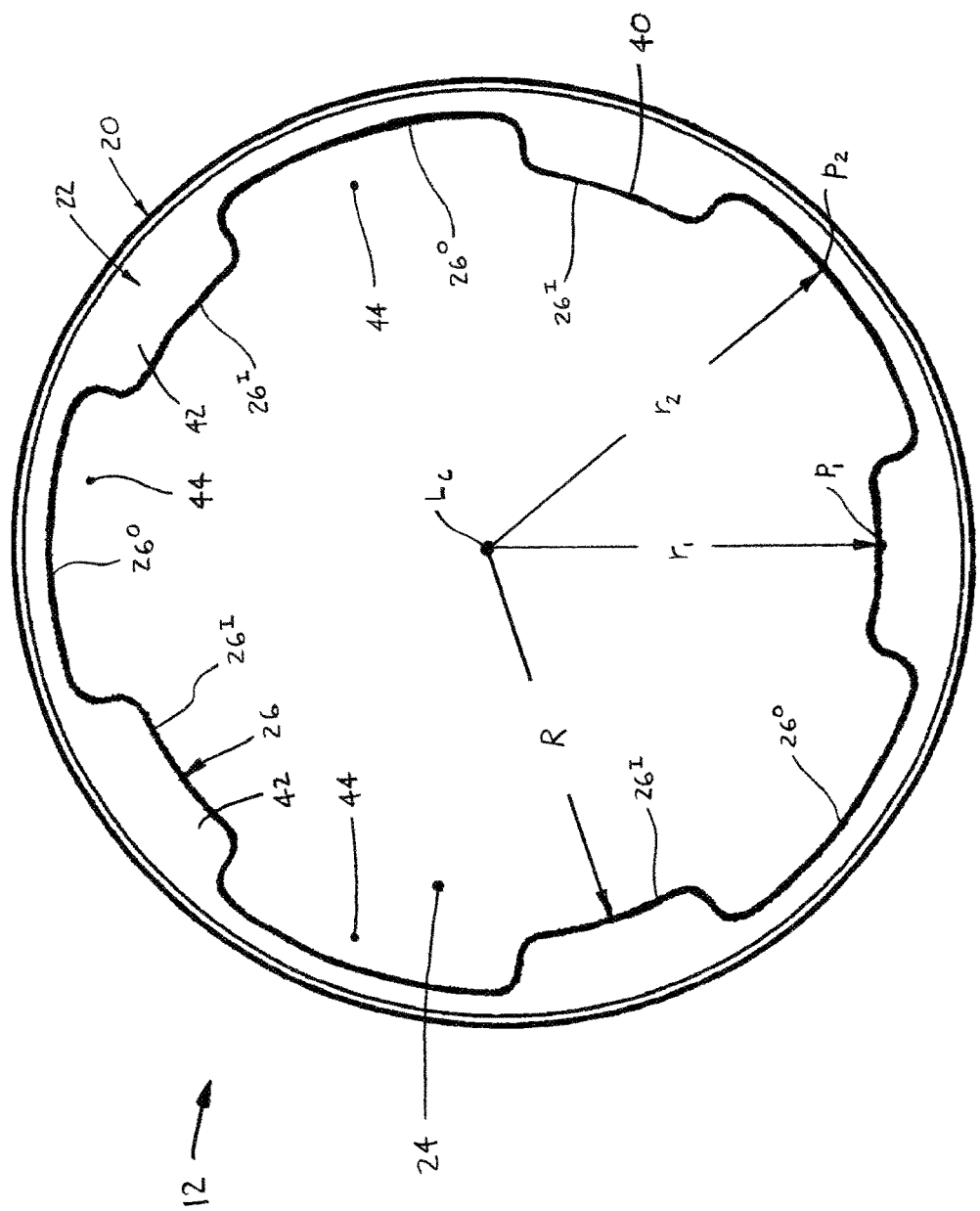
FIG. 6 is a top plan view of a variation of the first construction support member of the seal assembly.
Figure 7:
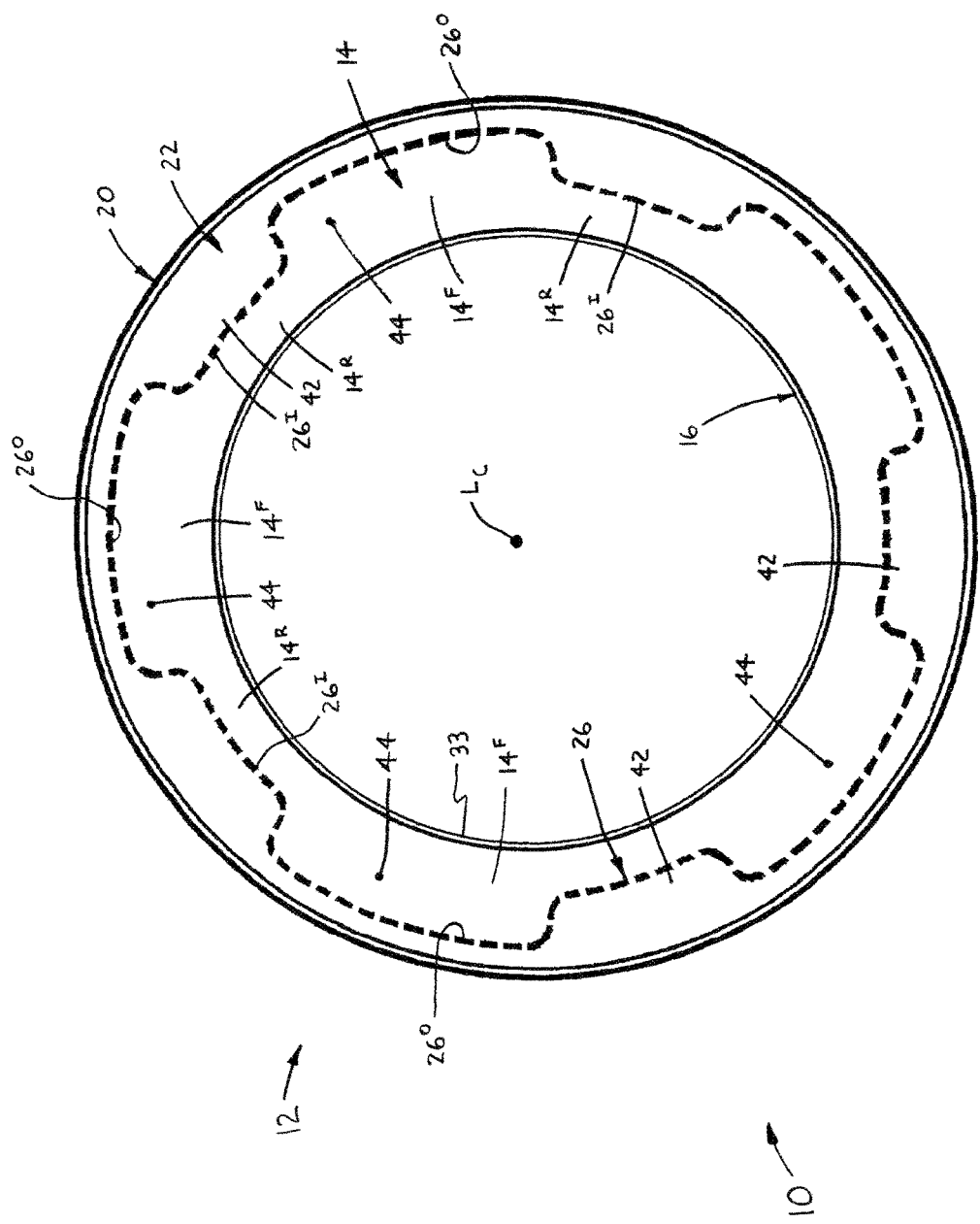
FIG. 7 is a more diagrammatic, top plan view of the seal assembly with the variation of the first construction support member.

Referring to FIGS. 3-9, in each one of a first and a second exemplary construction, the support member 12 is formed with a central opening 24 that is generally centered about the support member centerline $L_C$ and defined by an inner edge 26 which varies radially about the centerline $L_C$. Specifically, in a first exemplary construction shown in FIGS. 3-7, the inner radial end 22b of the support member radial portion 22 has a complex-shaped closed inner edge 40 (i.e., forms an enclosed geometric figure) defining the central opening 24 and a plurality of arcuate tabs 42 projecting radially inwardly from a remainder of the radial portion 22. The plurality of arcuate tabs 42 are spaced circumferentially about the support member centerline $L_C$, either generally evenly or unevenly, such that a separate one of a plurality of arcuate recesses 44 are defined circumferentially between each pair of adjacent tabs 42. The inner edge 40 may define an even number of tabs 42 and recesses 44 (e.g., four of each) and be symmetric about the centerline $L_C$, as shown in FIGS. 3 and 4, or may define an odd number of tabs 42 and recesses 44 (e.g., five of each) and be asymmetric about the centerline $L_C$, as depicted in FIGS. 6 and 7. In either case, the inner edge 40 has a radius or radial distance R about the centerline $L_C$ that varies about the perimeter of the edge 40 between a lesser value within each tab 42 and a greater value within each recess 44.

Although depicted and described as being arcuate, the tabs 42 and/or recesses 44 may be formed in any other appropriate shape, such as for example, curved, semi-hemispherical, rectangular, triangular, truncated triangular, etc. and be uniformly shaped or any combination of desired shapes. Also, the complex-shaped inner closed edge 40 may be formed without any pattern of tabs and recesses and instead having any desired complex (or even simple), enclosed shape or profile with a varying inner radial distance R about the centerline $L_C$.

With any of the appropriate structures, the sealing lip contact pressure CP within each section of the sealing interface SI located axially adjacent to one of the plurality of tabs 42 is greater than the sealing lip contact pressure CP within each section of the sealing interface SI located axially adjacent to one of the plurality of recesses 44, as indicated by the pressure envelope PE of FIG. 5. Thus, as discussed above, the varying contact pressure CP around the sealing interface SI induces a pumping effect to direct any liquid out of the sealing interface SI. Further, with the support member 12 having tabs 42 and recesses 44, due to the preferred thermal bonding of the sealing member 14 to the support member 12 as discussed above, each section of the sealing lip 14 located axially adjacent to one of the recesses 44 has shrinkage after cooling that is greater than shrinkage of each section of the sealing lip 14 located axially adjacent to one of the tabs 42. As such, the opening 19 (FIG. 1) defined by an inner surface 17 of the sealing lip 16 has an inside diameter ID (FIG. 1) that varies slightly and circumferentially around the centerline $L_C$ of the support member 12. Also, the axial length (not indicated) between the lip inner portion first and second ends 32a, 32b varies about the perimeter of the lip 16 due to the differences in shrinkage. The combination of the varying inside diameter ID and varying axial length of the lip 16 provides a "waviness" to the lip inner surface 17, which further increases the pumping effect induced by the varying contact pressure CP.

Figure 8:
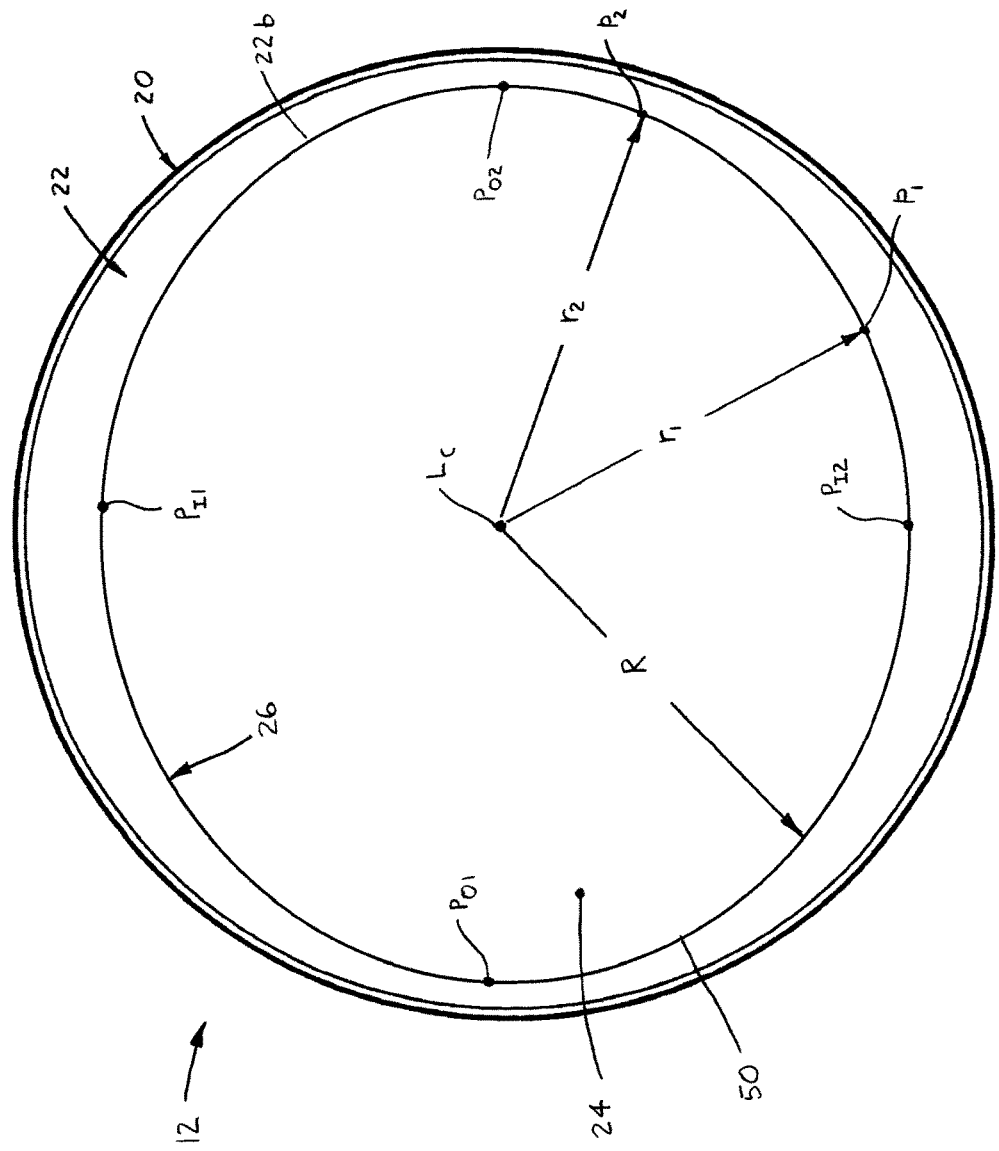
FIG. 8 is a top plan view of a second construction support member of the seal assembly.
Figure 9:
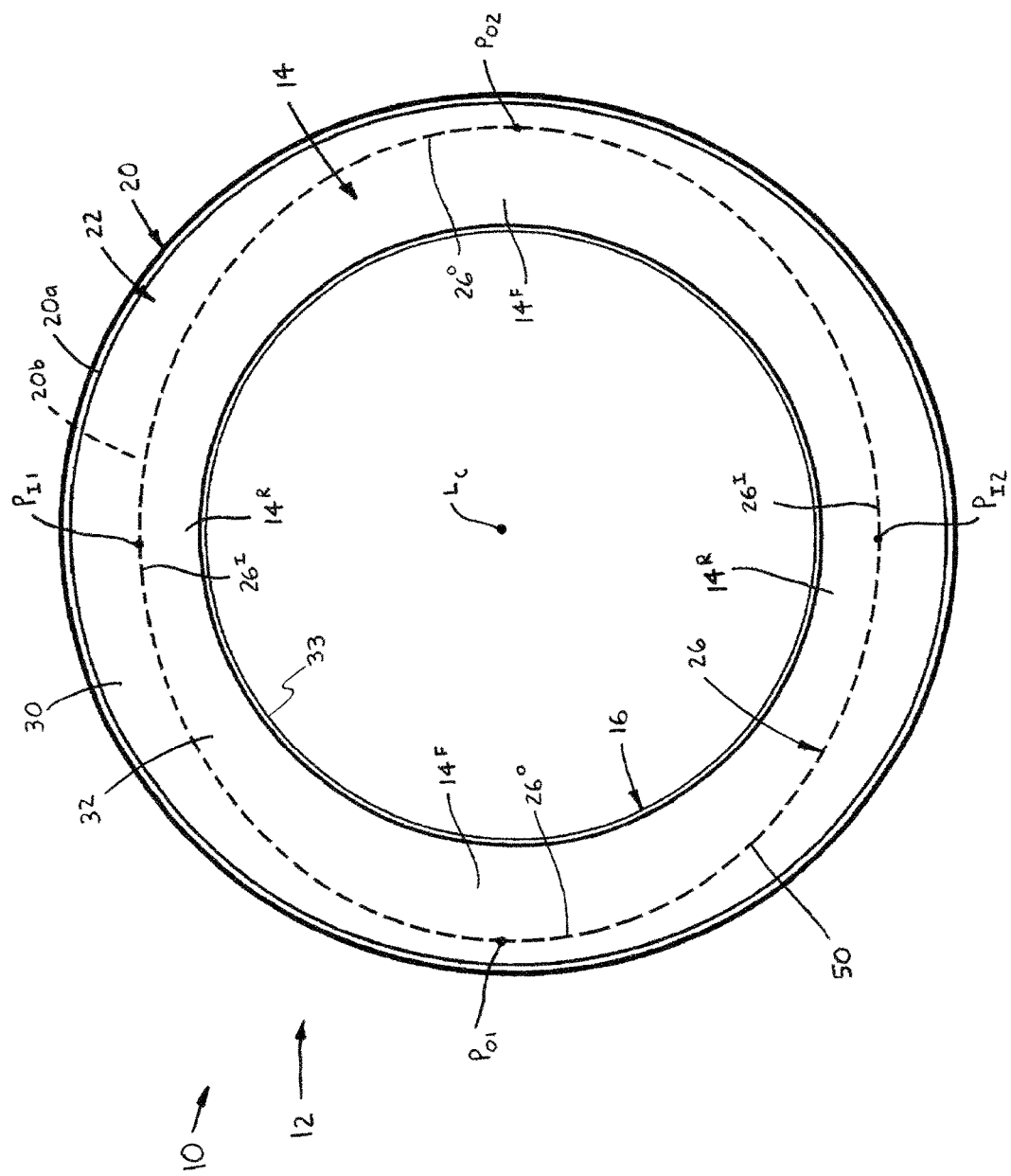
FIG. 9 is a more diagrammatic, top plan view of the seal assembly with the second construction support member.

Referring to FIGS. 8 and 9, in the second exemplary construction, the inner radial end 22b of the support member radial portion 22 has an elliptical inner edge 50 defining the central opening 24 and extending elliptically around the centerline $L_C$ of the support member 12. Thus, the inner edge 50 is a continuous curve with a radius $R_E$ about the centerline $L_C$ that varies continuously and smoothly, such that there are no "abrupt" changes or discontinuities in the radius $R_E$ around the perimeter of the edge 50. Further, the elliptical inner edge 50 has two radially innermost points $P_{I1}$, $P_{I2}$ with respect to the support member centerline $L_C$ and two radially outermost points $P_{O1}$, $P_{O2}$ with respect to the centerline $L_C$. As such, the sealing lip contact pressure CP has a greatest value within each section of the sealing interface SI located axially adjacent to one of the two innermost points $P_{I1}$ or $P_{I2}$ of the elliptical inner edge 50 and the sealing lip contact pressure CP has a least value within each section of the sealing interface SI located axially adjacent to one of the two outermost points $P_{O1}$ or $P_{O2}$ of the elliptical inner edge 50. Also, the contact pressure CP increases within each section of the sealing interface SI between each outermost point $P_{O1}$ or $P_{O2}$ and the adjacent innermost point $P_{I1}$, $P_{I2}$, respectively, and decreases within each section of the interface SI between each innermost point $P_{I1}$ or $P_{I2}$ and the adjacent outermost point $P_{O1}$, $P_{O2}$, respectively.

Figure 10:
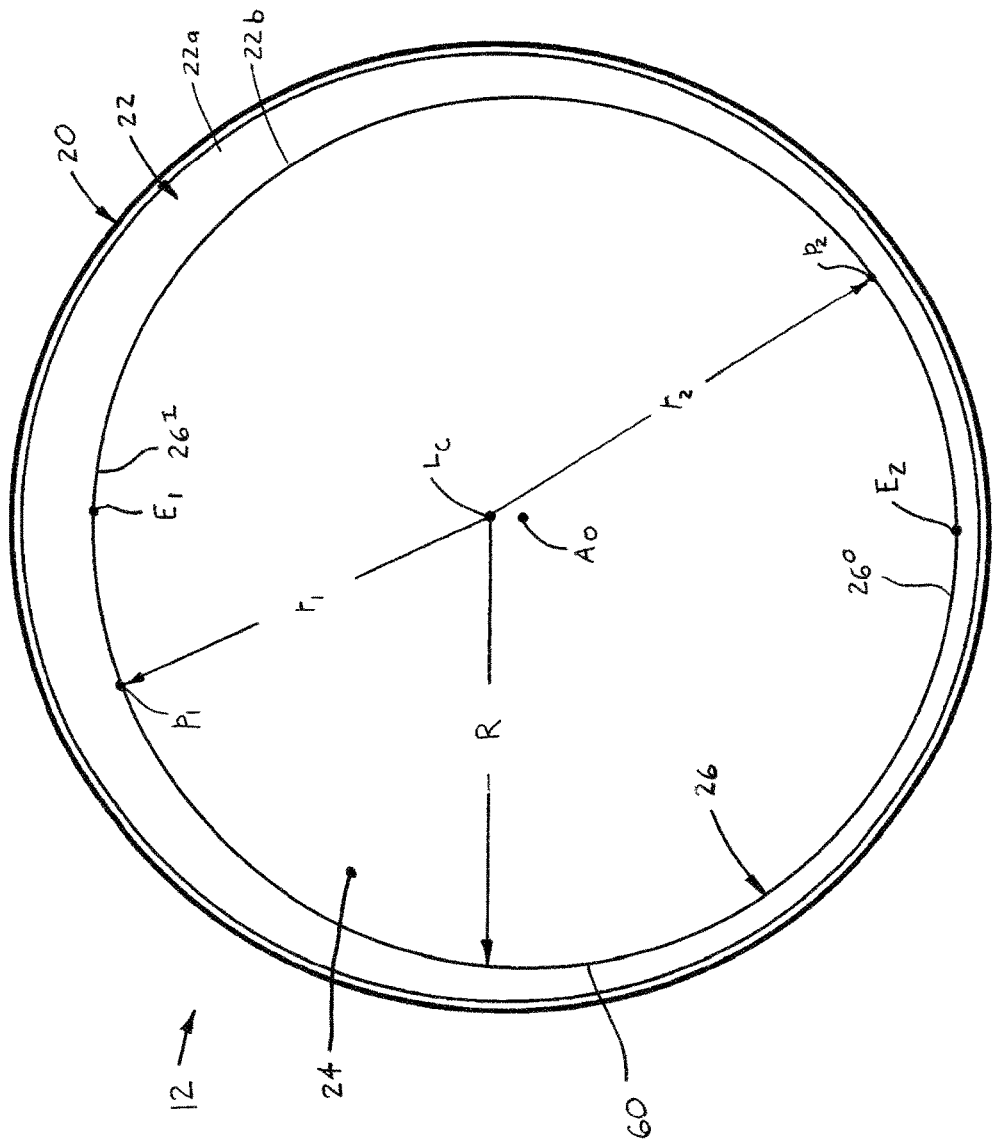
FIG. 10 is a top plan view of a third construction support member of the seal assembly.
Figure 11:
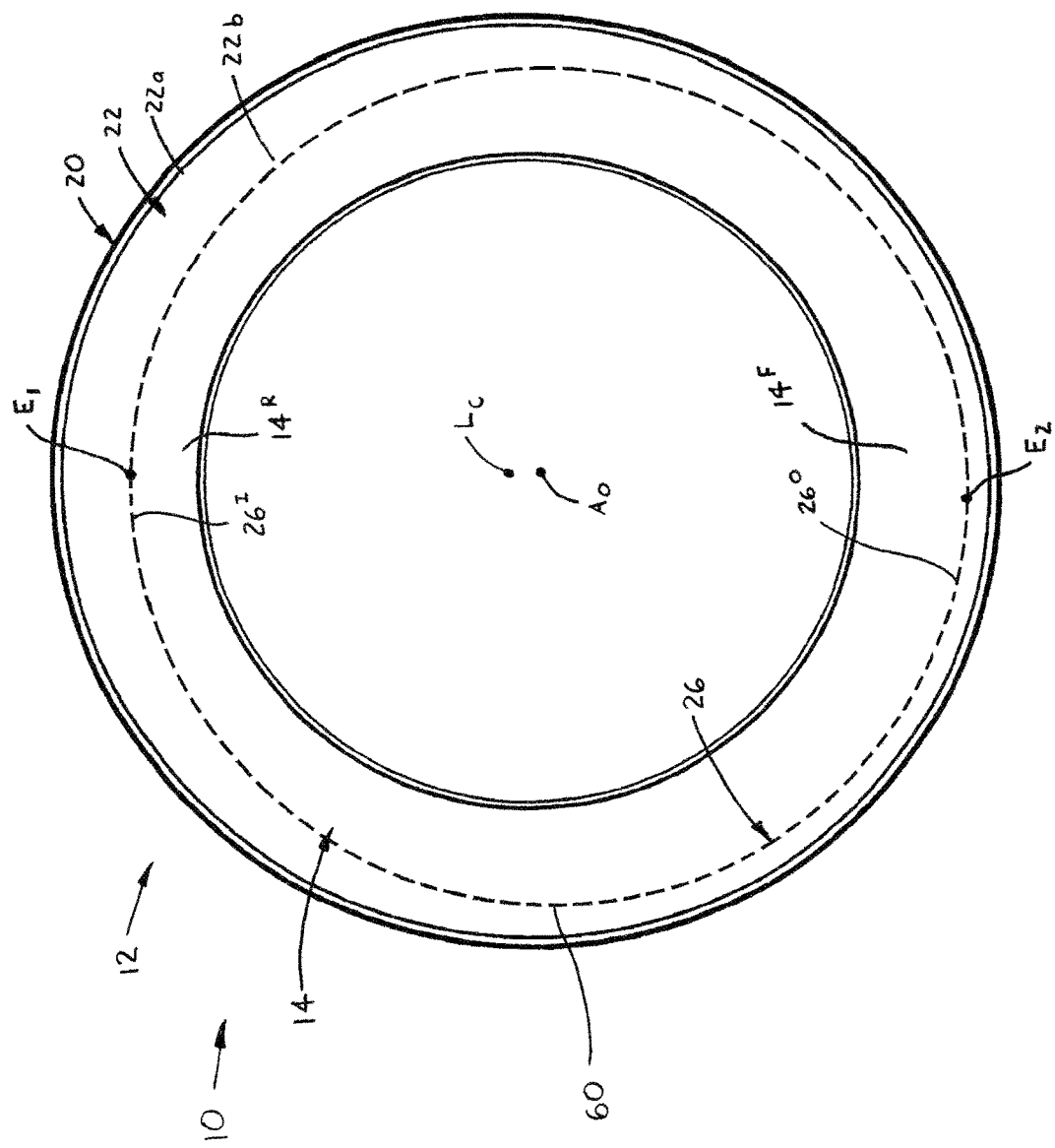
FIG. 11 is a more diagrammatic, top plan view of the seal assembly with the third construction support member.

Referring now to FIGS. 10 and 11, in a third preferred construction, the support member 12 is formed with the inner radial end 22b of the support member radial portion 22 having a circular inner edge 60 defining the central opening 24 and extending circumferentially and eccentrically around the centerline $L_C$ of the support member 12. That is, the circular inner edge 60 of the support member radial portion 20 is centered about an axis $A_O$ spaced radially from the centerline $L_C$ of the support member 12. With this structure, the circular inner edge 60 has a radially innermost point $E_1$ with respect to the centerline $L_C$ and a radially outermost point $E_2$ with respect to the centerline $L_C$. As such, during use of the seal assembly 10 with the third construction support member 12, the sealing lip contact pressure CP has a greatest value within a section of the sealing interface SI located axially adjacent to the support member innermost point $E_1$. Conversely, the sealing lip contact pressure CP has a least value within a section of the sealing interface SI disposed axially adjacent to the support member outermost point $E_2$, and varies generally linearly between the greatest and least values.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A seal assembly for sealing between an inner shaft and an outer member, the outer member having an inner circumferential surface defining a bore and the shaft being disposed within the bore and having an outer circumferential surface, the shaft or the outer member being rotatable about a central axis extending through the shaft, the seal assembly comprising:

an annular rigid support member having a centerline and including an axial portion coupleable with the outer member and a radial portion extending inwardly from the axial portion, the radial portion having an outer radial end integrally formed with the axial portion and an inner radial end defining a central opening disposeable around the shaft and being formed asymmetrical about the centerline and/or having a varying radial distance from the centerline; and an annular sealing member having an outer portion attached to the support member and an inner portion with a first end providing a sealing lip, the sealing lip being sealingly engageable with a running surface about the shaft so as to define a circumferential sealing interface, and a second end attached to the inner end of the support member radial portion such that a contact pressure of the sealing lip against the running surface varies about a circular perimeter of the sealing interface.

2. The seal assembly as recited in claim 1 wherein the sealing assembly is configured such that a liquid entering the sealing interface is directed axially out of the sealing interface by the varying contact pressure of the sealing lip against the running surface when the shaft or the outer member rotates about the central axis.

3. The seal assembly as recited in claim 1 wherein the inner radial end of the support member radial portion has a closed inner edge defining the central opening and formed such that a radial distance between each point on the edge and the centerline of the support member varies about the perimeter of the edge.

4. The seal assembly as recited in claim 1 wherein the inner radial end of the support member radial portion has a complex-shaped closed inner edge defining the central opening and a plurality of tabs projecting radially inwardly from a remainder of the radial portion, the plurality of tabs being spaced circumferentially about the support member centerline such that a separate one of a plurality of recesses is defined circumferentially between each pair of adjacent tabs.

5. The seal assembly as recited in claim 4 wherein each one of the plurality of tabs and each one of the plurality of recesses is arcuate or partially hemispherical.

6. The seal assembly as recited in claim 4 wherein the sealing lip contact pressure within each section of the sealing interface located axially adjacent to one of the plurality of tabs is greater than the sealing lip contact pressure within each section of the sealing interface located axially adjacent to one of the plurality of recesses.

7. The seal assembly as recited in claim 6 wherein the sealing member is thermally bonded to the support member such each section of the sealing lip located axially adjacent to one of the recesses has shrinkage after cooling that is greater than shrinkage of each section of the sealing lip located axially adjacent to one of the tabs such that an opening defined by an inner surface of the sealing lip has an inside diameter that varies circumferentially around the centerline of the support member.

8. The seal assembly as recited in claim 1 wherein the inner radial end of the support member radial portion has an elliptical inner edge defining the central opening and extending elliptically around the centerline of the support member.

9. The seal assembly as recited in claim 8 wherein the elliptical inner edge of the support member radial portion has two radially innermost points with respect to the centerline and two radially outermost points with respect to the centerline such that the sealing lip contact pressure has a greatest value within each section of the sealing interface located axially adjacent to one of the two innermost points of the elliptical inner edge and the sealing lip contact pressure has a least value within each section of the sealing interface located axially adjacent to one of the two outermost points of the elliptical inner edge.

10. The seal assembly as recited in claim 1 wherein the inner radial end of the support member radial portion has a circular inner edge defining the central opening and extending circumferentially and eccentrically around the centerline of the support member.

11. The seal assembly as recited in claim 10 wherein the circular inner edge of the support member radial portion is centered about an axis spaced radially from the centerline of the support member.

12. The seal assembly as recited in claim 10 wherein the circular inner edge of the support member radial portion has a radially innermost point with respect to the centerline and a radially outermost point with respect to the centerline such that the sealing lip contact pressure has a greatest value within a section of the sealing interface located axially adjacent to the support member innermost point and the sealing lip contact pressure has a least value within a section of the sealing interface disposed radially inwardly from the support member outermost point.

13. The seal assembly as recited in claim 1 wherein the inner portion of the sealing member has a thickness that increases in a direction from the second end and toward the first free end such that the sealing lip has generally wedge-shaped axial cross-sections.

14. The seal assembly as recited in claim 1 wherein the support member is formed as a metal stamping and the sealing member is formed as an elastomeric body that is bonded to the metal stamping.

15. A seal assembly for sealing between an inner shaft and an outer member, the outer member having an inner circumferential surface defining a bore and the shaft being disposed within the bore and having an outer circumferential surface, the shaft or the outer member being rotatable about a central axis extending through the shaft, the seal assembly comprising:

an annular rigid support member having a centerline and including an axial portion coupleable with the outer member and a radial portion extending inwardly from the axial portion, the radial portion having an outer radial end integrally formed with the axial portion and an inner radial end with a closed inner edge defining a central opening disposeable around the shaft, the inner edge extending asymmetrically about the centerline; and an annular sealing member having an outer portion attached to the support member and an inner portion with a first end providing a sealing lip, the sealing lip being sealingly engageable with a running surface about the shaft so as to define a circumferential sealing interface, and a second end attached to the inner edge of the support member radial portion such that a contact pressure of the sealing lip against the running surface varies about a circular perimeter of the sealing interface.

16. The seal assembly as recited in claim 15 wherein the closed inner edge extends radially and circumferentially about the centerline such that a radial distance between each point on the edge and the centerline of the support member varies about the perimeter of the edge.

17. The seal assembly as recited in claim 15 wherein the closed inner edge is complex-shaped or elliptical or circular and eccentric about the support member centerline.

18. A seal assembly for sealing between an inner shaft and an outer member, the outer member having an inner circumferential surface defining a bore and the shaft being disposed within the bore and having an outer circumferential surface, the shaft or the outer member being rotatable about a central axis extending through the shaft, the seal assembly comprising:

an annular rigid support member having a centerline and including an axial portion coupleable with the outer member and a radial portion extending inwardly from the axial portion, the radial portion having an outer radial end integrally formed with the axial portion and an inner radial end with a closed inner edge defining a central opening disposeable around the shaft, the inner edge extending circumferentially around and having a varying radial distance from the centerline; and an annular sealing member having an outer portion attached to the support member and an inner portion with a first end providing a sealing lip, the sealing lip being sealingly engageable with a running surface about the shaft so as to define a circumferential sealing interface, and a second end attached to the inner edge of the support member radial portion such that a contact pressure of the sealing lip against the running surface varies about a circular perimeter of the sealing interface.

19. The seal assembly as recited in claim 18 wherein the closed inner edge extends radially and circumferentially about the centerline such that a radial distance between each point on the edge and the centerline of the support member varies about the perimeter of the edge.

20. The seal assembly as recited in claim 18 wherein the closed inner edge is complex-shaped or elliptical.

* * * * *